United States Patent
Lee et al.

(10) Patent No.: US 8,812,058 B2
(45) Date of Patent: Aug. 19, 2014

(54) MOBILE TERMINAL HAVING MULTI-FUNCTION EXECUTING CAPABILITY AND EXECUTING METHOD THEREOF

(75) Inventors: Eun-Young Lee, Seoul (KR); Kye-Sook Jeong, Seoul (KR); Hye-Youn Cho, Seoul (KR); Hye-Eun Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 12/245,883

(22) Filed: Oct. 6, 2008

(65) Prior Publication Data

US 2009/0093277 A1 Apr. 9, 2009

(30) Foreign Application Priority Data

Oct. 5, 2007 (KR) .......................... 10-2007-0100565

(51) Int. Cl.
*H04B 1/38* (2006.01)

(52) U.S. Cl.
USPC ............. 455/566; 455/550.1; 455/556.1; 455/556.2; 345/173; 715/863

(58) Field of Classification Search
CPC ............... H04M 1/274525; H04M 1/72583; H04M 2250/22; G06F 3/017; G06F 3/0488; G06F 3/0486
USPC ....................................... 455/566
See application file for complete search history.

(56) References Cited

U.S. PATENT DOCUMENTS

| | | | |
|---|---|---|---|
| 2004/0119763 A1* | 6/2004 | Mizobuchi et al. | 345/863 |
| 2004/0204129 A1* | 10/2004 | Payne et al. | 455/566 |
| 2006/0214871 A1* | 9/2006 | Iwamura | 345/1.1 |
| 2006/0214935 A1* | 9/2006 | Boyd et al. | 345/473 |
| 2006/0238517 A1* | 10/2006 | King et al. | 345/173 |
| 2008/0052945 A1* | 3/2008 | Matas et al. | 34/173 |
| 2008/0082934 A1* | 4/2008 | Kocienda et al. | 715/773 |
| 2008/0094369 A1* | 4/2008 | Ganatra et al. | 345/173 |
| 2008/0094371 A1* | 4/2008 | Forstall et al. | 345/173 |
| 2008/0122796 A1* | 5/2008 | Jobs et al. | 345/173 |
| 2008/0165160 A1* | 7/2008 | Kocienda et al. | 345/175 |
| 2008/0320403 A1* | 12/2008 | Glaberson | 715/763 |
| 2009/0006955 A1* | 1/2009 | Wang et al. | 715/702 |

FOREIGN PATENT DOCUMENTS

KR 10-2003-0015503 2/2003

OTHER PUBLICATIONS

Korean Intellectual Property Office Application Serial No. 10-2007-0100565, Office Action dated Sep. 23, 2013, 5 pages.

* cited by examiner

*Primary Examiner* — Liton Miah
(74) *Attorney, Agent, or Firm* — Lee, Hong, Degerman, Kang & Waimey

(57) ABSTRACT

A mobile terminal having a touch function is provided. The mobile terminal includes a display module and a controller. The display module displays content lists in a content list screen. The controller is configured to divide a predetermined region of the content list screen into a first region and a second region and to execute different functions according to whether a content list in the content list screen is dragged to the first region or to the second region.

20 Claims, 6 Drawing Sheets

MOBILE TERMINAL HAVING MULTI-FUNCTION EXECUTING CAPABILITY AND EXECUTING METHOD THEREOF

CROSS-REFERENCE TO RELATED APPLICATIONS

Pursuant to 35 U.S.C. §119(a), this application claims the benefit of earlier filing date and right of priority to Korean Application No. 10-2007-0100565, filed on Oct. 5, 2007, the contents of which is incorporated by reference herein in its entirety.

FIELD OF THE INVENTION

The present invention relates to a mobile terminal having a touch function capable of displaying and executing a multi-function by a minimum touch input, and an executing method thereof.

DESCRIPTION OF THE RELATED ART

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players.

Efforts are ongoing to support and increase the functionality of mobile terminals. Such efforts include software and hardware improvements, as well as changes and improvements in the structural components which form the mobile terminal. For instance, a user interface to allow a user to easily and conveniently search or select a function is provided. As the mobile terminal is regarded as a person's belonging to express the owner's personality, various functions are required.

The mobile terminal has various functions and is regarded as a multimedia player. A user can obtain various information through the mobile terminal. For example, the user can search corresponding information by selecting a specific menu from option menus or a command from a selected menu.

However, the conventional mobile terminal has the following problems. When one or more contents in list form are selected, or messages in a list are deleted by using a command from an option menu, menu search has to be performed through multiple steps. The problem is worse when the selection and deletion are simultaneously performed, as the number of steps for menu search increases. Having multiple menu search steps is an inconvenience to a user when searching and using information.

SUMMARY OF THE INVENTION

A mobile terminal having a touch function and which is capable of displaying and executing a multi-function by a minimum touch input is provided. A method for executing the multi-function of the mobile terminal is also provided.

In an exemplary embodiment of the present invention, a mobile terminal having a touch function is provided. The mobile terminal includes a display module and a controller. The display module displays content lists in a content list screen. The controller is configured to divide a predetermined region of the content list screen into a first region and a second region and to execute different functions according to whether a content list in the content list screen is dragged to the first region or to the second region.

In one embodiment, the controller executes a first function when the content list is dragged to the first region, and executes a second function when the content list is dragged to the second region through the first region.

In one embodiment, the first function displays a selection window for each content list in the content list screen and the second function displays a trash box icon.

In one embodiment, when the content list is dragged, other content lists are simultaneously moved.

In one embodiment, when the content list is dragged through the first region and the second region, the controller deletes the content list.

In an exemplary embodiment of the present invention, a mobile terminal having a touch function is provided. The mobile terminal includes a display module and a controller. The display module displays content lists in a content list screen. The controller is configured to display a selection window for each content list in the content list screen when a content list is dragged to a first region and to display a trash box icon when the content list is dragged to a second region through the first region.

In one embodiment, when the content list is dragged through the trash box icon, the controller deletes the content list.

In one embodiment, when the content list is dragged to the first region, other content lists are simultaneously moved.

In one embodiment, once the content list passes through the first region, said other content lists are restored to their original positions.

In one embodiment, the trash box icon is displayed at a side of the content list screen when the content list approaches said side of the content list screen.

In one embodiment, if the content list is not deleted after passing through the trash box icon before a predetermined time period lapses, the content list is restored to its original position.

In an exemplary embodiment of the present invention, a method for executing a multi-function of a mobile terminal having a touch function is provided. At least one content list is displayed on a content list screen. Different functions are executed when a content list of said at least one content list is sequentially dragged to a first region and to a second region.

In one embodiment, when the content list is dragged to the first region, a selection window for each content list in said at least one content list is displayed, and when the content list is dragged to the second region through the first region, a trash box icon is displayed.

In one embodiment, the content list is deleted when dragged through the second region.

In one embodiment, when the content list is dragged to the first region, other content lists in said at least one content list are simultaneously moved.

In one embodiment, once the content list passes through the first region, said other content lists are restored to their original positions.

In one embodiment, the trash box icon is displayed at a side of the content list screen when the content list approaches said side of the content list screen.

In one embodiment, if the content list is not deleted after passing through the trash box icon before a predetermined time period lapses, the content list is restored to its original position.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to the exemplary embodiments of the present invention, examples of which are illustrated in the accompanying drawings. Hereinafter, a mobile terminal in an exemplary embodiment of the present invention will be described with reference to the accompanying drawings.

Figure 1:
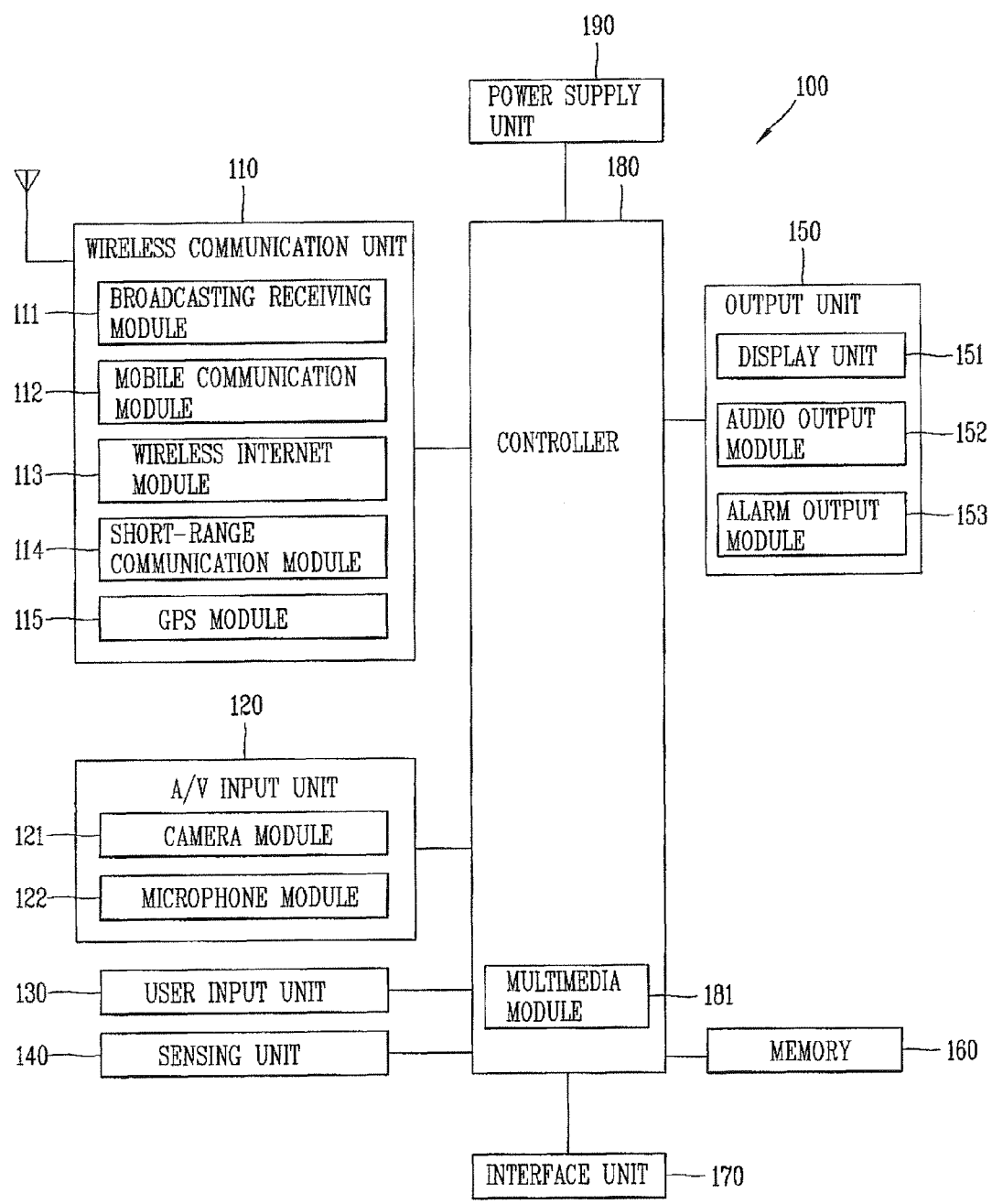
FIG. 1 is a block diagram illustrating a mobile terminal according to an exemplary embodiment of the present invention.

FIG. 1 is a block diagram illustrating a mobile terminal 100 according to an exemplary embodiment of the present invention. The mobile terminal 100 may be implemented using a variety of different types of terminals. Examples of such terminals include mobile phones, smart phones, notebook computers, digital broadcast terminals, Personal Digital Assistants (PDA), Portable Multimedia Players (PMP), and navigators.

The mobile terminal 100 of an exemplary embodiment of the present invention will now be described from its functional perspective with reference to FIG. 1. The mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190, and the like.

FIG. 1 shows the mobile terminal 100 having various components, but it is understood that implementing all of the illustrated components is not a requirement. Greater or fewer components may alternatively be implemented.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless internet module 113, a short-range communication module 114, and a GPS module 115.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends the information to the mobile terminal.

Examples of broadcast associated information may include information associated with a broadcast channel, a broadcast program, and a broadcast service provider. The broadcast signal may be implemented as a TV broadcast signal, a radio broadcast signal, or a data broadcast signal. The broadcast signal may further include a data broadcast signal combined with a TV or radio broadcast signal. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), and Electronic Service Guide (ESG) of Digital Video Broadcast-Handheld (DVB-H).

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO™), Digital Video Broadcast-Handheld (DVB-H), and Integrated Services Digital Broadcast-Terrestrial (ISDB-T).

The broadcast receiving module 111 may be configured to be suitable for every broadcast system transmitting broadcast signals as well as digital broadcasting systems. Broadcast signals and/or broadcast associated information received via the broadcast receiving module 111 may be stored in a suitable device, such as a memory 160.

The mobile communication module 112 transmits/receives wireless signals to/from at least one network entity (e.g., base station, an external mobile terminal, a server) in a mobile communication network. The wireless signals may include audio call signal, video call signal, or various formats of data according to transmission/reception of text/multimedia messages.

The wireless Internet module 113 supports wireless Internet access for the mobile terminal. This module may be internally or externally coupled to the mobile terminal 100.

The short-range communication module 114 denotes a module for short-range communications. Suitable technologies for implementing this module may include Bluetooth™, Radio Frequency Identification (RFID), Infrared Data Association (IrDA), Ultra-WideBand (UWB), and ZigBee™.

The GPS module 115 denotes a module for detecting or calculating a position of a mobile terminal 100. An example of the GPS module 115 may include a position-location module. The GPS module may receive position information in cooperation with associated multiple satellites. The position information may include coordinates information represented by latitude and longitude.

For example, the GPS module can measure accurate time and distance respectively from more than three satellites so as to accurately calculate a current position of the mobile terminal based on three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

The A/V input unit 120 is configured to provide audio or video signal input to the mobile terminal 100. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted externally via the wireless communication unit 110. Two or more cameras 121 may be provided according to the configuration of the mobile terminal.

The microphone 122 may receive an external audio signal while the mobile terminal 100 is in a particular mode, such as a phone call mode, a recording mode, or a voice recognition mode. This audio signal is processed into digital data. The processed digital data is converted for output in a format transmittable to a mobile communication base station via the mobile communication module 112 of the phone call mode. The microphone 122 may include assorted noise removing algorithms to remove noise generated while receiving the external audio signal.

The user input unit 130 may receive data input by a user to control the operation of the mobile terminal 100. The user input unit 130 may include a keypad, a dome switch, a touch pad (e.g., static pressure/capacitance), a jog wheel, or a jog switch. The touch pad may be layered with the display 151 so as to be in cooperation with the display 151. Such a configuration is referred to as a touch screen.

The sensing unit 140 provides status measurements of various aspects of the mobile terminal 100. For instance, the sensing unit 140 may detect an open/close status of the mobile terminal 100, a change in a location of the mobile terminal 100, a presence or absence of user contact with the mobile terminal 100, and acceleration/deceleration of the mobile terminal 100, in order to generate a sensing signal for controlling the operation of the mobile terminal 100.

For example, in a slide-type mobile terminal, the sensing unit 140 may sense whether a sliding portion of the mobile terminal 100 is open or closed. Other examples include sensing functions, such as the presence or absence of power provided by the power supply 190, the presence or absence of a coupling or other connection between the interface unit 170 and an external device.

The interface unit 170 is generally implemented to couple the mobile terminal 100 to external devices. The interface unit 170 may include wired/wireless headset ports, external charger ports, wired/wireless data ports, memory card ports, ports for coupling devices having an identification module, audio Input/Output (I/O) ports, video I/O ports, or earphone ports.

The identification module may be configured as a chip for storing various information required to authenticate an authority to use the mobile terminal 100. The mobile terminal 100 may include a User Identity Module (UIM), a Subscriber Identity Module (SIM), or a Universal Subscriber Identity Module (USIM). A device having an identification module (hereinafter, referred to as 'identification device') may be implemented in a type of smart card. Hence, an identification device can be coupled to the mobile terminal 100 via a port.

The interface unit 170 may receive data from an external device or receive power and transfer the received data or power to each component within the mobile terminal 100 or transfer data of the mobile terminal 100 to an external device.

The output unit 150 is configured to output an audio signal, a video signal or an alarm signal. The output unit 150 may include a display 151, an audio output module 152, or an alarm 153.

The display 151 may output information processed in the mobile terminal 100. For example, when the mobile terminal 100 is operating in a phone call mode, the display 151 will provide a user interface (UI) or a graphical user interface (GUI) which includes information associated with the call. As another example, if the mobile terminal is in a video call mode or a capturing mode, the display 151 may additionally or alternatively display images captured and/or received through a UI or a GUI.

As mentioned previously, a touch screen can be configured including a display 151 layered with a touch pad to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or Transparent OLED (TOLED).

In an exemplary embodiment, the mobile terminal 100 may include two or more of such displays 151. For example, the mobile terminal 100 may simultaneously include an external display (not shown) and an internal display (not shown).

The audio output module 152 may output audio data which is stored in the memory 160 or received from the wireless communication unit 110 in various modes including call-receiving mode, call-placing mode, recording mode, voice recognition mode, and broadcast reception mode. The audio output module 152 may output an audio signal relating to a particular function (e.g., call received, message received, etc.) performed in the mobile terminal 100. The audio output module 152 may be implemented using a speaker, a buzzer, or the like.

The alarm 153 may output a signal to inform a user of an event associated with the mobile terminal 100. Typical events may include call received, message received, and user input received.

In addition to outputting an audio or video signal, the alarm 153 may inform a user of the event in different manners, such as by providing tactile sensations (e.g., vibration) to a user. The alarm 153 may also be configured to vibrate in response to the mobile terminal receiving a call or message. As another example, vibration is provided by the alarm 153 in response to receiving user input at the mobile terminal, thus providing a tactile feedback mechanism. Such vibration can also be provided to make a user recognize the event. The signal informing the event may be output in a video signal via the display 151 or in an audio signal via the audio output module 152.

The memory 160 may store a program for the processing and control of the controller 180. Alternatively, the memory 160 may temporarily store input/output data (e.g., phonebook data, messages, still images, and video). The memory 160 may be implemented using any type of suitable storage medium including a flash memory, a hard disk, a multimedia micro card, a memory card (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The mobile terminal 100 may operate a web storage which performs the storage function of the memory 160 on the Internet.

The controller 180 typically controls the overall operations of the mobile terminal 100. For example, the controller 180 performs the control and processing associated with voice calls, data communications, and video calls. The controller 180 may include a multimedia module 181 which provides multimedia playback. The multimedia module 181 may be configured as part of the controller 180 or as a separate component.

The power supply 190 provides power required by various components under the control of the controller 180. The provided power may be internal power, external power, or a combination thereof.

Various exemplary embodiments described herein may be implemented in a computer-readable medium using, for example, software, hardware, or some combination thereof.

For a hardware implementation, the exemplary embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such exemplary embodiments are implemented by the controller 180.

For a software implementation, procedures and functions may be implemented together with separate software modules each of which performs at least one of the functions and operations. The software codes can be implemented with a software application written in any suitable programming language. Also, the software codes may be stored in the memory 160 and executed by the controller 180.

As mentioned above, the internal components of the mobile terminal 100 related to the present invention have been described from the perspective of their functions. Hereinafter, external components of the mobile terminal related to the present invention will be described from the perspective of their functions with reference to FIG. 2 and FIG. 3.

The mobile terminal 100 may be implemented in a variety of different configurations. Examples of configurations include folder-type, slide-type, bar-type, rotational-type, or swing-type. Further disclosure will primarily relate to a slide-type mobile terminal. However, the present invention is not limited to the slide-type mobile terminal, but includes other types of terminals including the aforesaid types of terminals.

Figure 2:
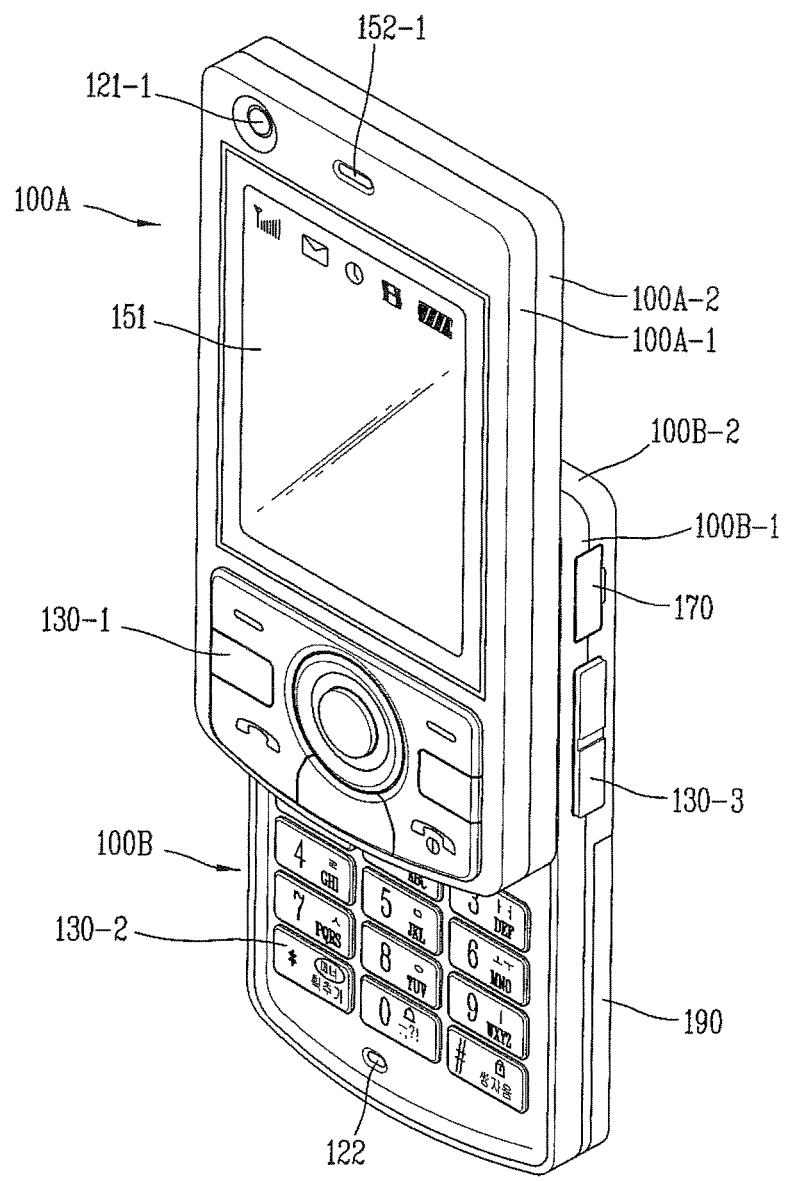
FIG. 2 is a perspective view of a front side of a mobile terminal in accordance with an exemplary embodiment of the present invention.

FIG. 2 is a perspective view of a front side of a mobile terminal 100 in accordance with an exemplary embodiment of the present invention. The mobile terminal 100 may include a first body 100A, and a second body 100B configured to slidably cooperate with the first body 100A in at least one direction. For a folder-type mobile terminal, the mobile terminal 100 may include the first body 100A, and the second body 100B configured to have at least one side folded or unfolded with respect to the first body.

The first body 100A is positioned over the second body 100B such that the second body 100B is obscured by the first body 100A. This state can be referred to as a closed configuration/position. As illustrated in FIG. 2, the state where the first body 100A exposes at least part of the second body 100B can be referred to as an open configuration/position.

The mobile terminal 100 may be operable in a standby mode when in the closed configuration, but this mode can be released by the user's manipulation. The mobile terminal 100 may typically be operable in an active (phone call) mode in the open configuration. In the open configuration, the mode may be changed into the standby mode according to the user's manipulation or after a certain time elapses.

A case (housing, casing, cover, etc.) forming the outside of the first body 100A is formed by a first front case 100A-1 and a first rear case 100A-2. Various electronic components may be located in a space between the first front case 100A-1 and the first rear case 100A-2. One or more intermediate cases may additionally be disposed between the first front case 100A-1 and the first rear case 100A-2. The cases can be formed of resin through injection molding or can be formed using metallic materials such as stainless steel (STS) and titanium (Ti).

A display 151, a first audio output module 152-1, a first camera module 121-1 or a first user input unit 130-1 may be disposed at the first front case 100A-1 of the first body 100A.

The display module 151 may include LCD or OLED, which can visibly display information. The display 151 and a touch pad can be layered with each other such that the display 151 can be configured to function as a touch screen to allow a user to input information in a touching manner.

The first audio output module 152-1 may be implemented as a speaker or a receiver. The first camera module 121-1 may be implemented to be suitable for a user to capture still images and/or moving images. The first user input unit 130-1 receives commands input for multi-selection and deletion in a touch manner.

A case configuring the outside of the second body 100B may be formed by a second front case 100B-1 and a second rear case 100B-2.

A second user input unit 130-2 may be located in the second body 100B, or specifically, at a front surface of the second front case 100B-1. A third user input unit 130-3, a microphone 122 and an interface unit 170 may be located at either the second front case 100B-1 or the second rear case 100B-2.

The first to third user input units 130-1, 130-2 and 130-3 may be called user input units (manipulation portions) 130. The user input unit 130 can be implemented for inputting information by a user in a tactile manner. For example, the user input unit 130 can be implemented as a dome switch or touch pad via which a user can input information in a pushing or touching manner, or implemented using a wheel, a jog, or a joystick to rotate keys.

The first user input unit 130-1 is used for inputting commands such as START, END, or SCROLL, and the second user input unit 130-2 is used for inputting numbers, characters, or symbols. The third user input unit 130-3 can be operated as a hot key for activating a specific function within the mobile terminal. The microphone 122 may be implemented for receiving a user's voice or various sounds.

The interface unit 170 may be used as a passage through which the mobile terminal 100 can exchange data with an external device. For example, the interface unit 170 may be implemented as a wired/wireless connection port for connecting an earphone to the mobile terminal, a port for short-range communications (e.g., an Infrared Data Association (IrDA) port, a Bluetooth port, a wireless LAN port), or power supply ports for providing power to the mobile terminal.

The interface unit 170 can be a card socket for receiving an external card, such as a Subscriber Identity Module (SIM), a User Identity Module (UIM), or a memory card for storing information.

A power supply 190 may be disposed at a side of the second rear case 100B-2 to provide power to the mobile terminal. The power supply 190 may be a rechargeable battery, which is capable of being attached/detached for charging.

Figure 3:
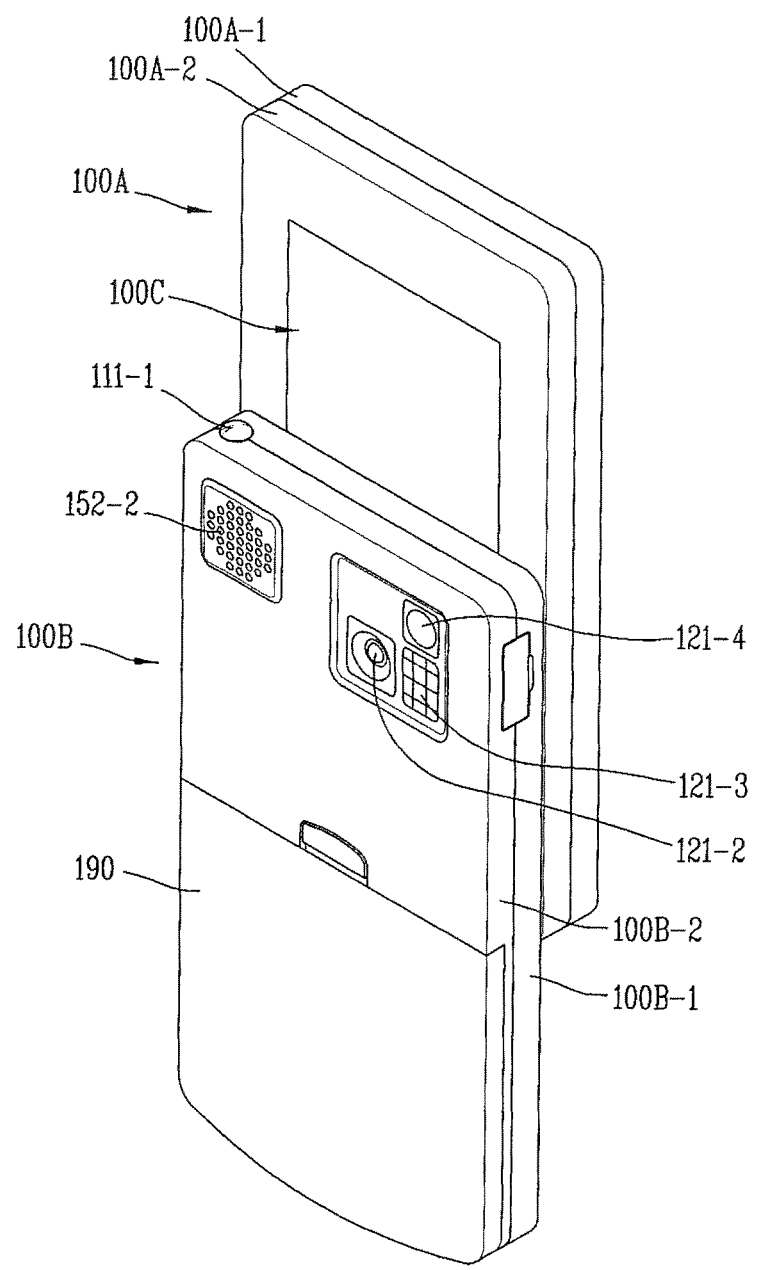
FIG. 3 is a perspective view of a rear side of a mobile terminal in accordance with an exemplary embodiment of the present invention.

FIG. 3 is a rear view of the mobile terminal 100 according to an exemplary embodiment of the present invention. As illustrated in FIG. 3, a second camera module 121-2 may be located at a rear face of the second rear case 100B-2 of the second body 100B. The second camera module 121-2 faces a direction which is opposite to a direction faced by the first camera module 121-1, and may have different pixels from those of the first camera module 121-1.

For example, the first camera module 121-1 may operate with relatively lower pixels (lower resolution). Thus, the first camera module 121-1 may be useful when a user can capture an image of his face and send the image to another party during a video call. On the other hand, the second camera module 121-2 may operate with a relatively higher pixels (higher resolution) such that it can be useful for a user to obtain higher quality pictures for later use.

A flash 121-3 and a mirror 121-4 may additionally be disposed adjacent to the second camera module 121-2. The flash 121-3 provides light to a subject to be captured when taking a picture using the second camera module 121-2. The mirror 121-4 can cooperate with the second camera module 121-2 to allow a user to photograph himself in a self-portrait mode.

The second rear case 100B-2 may further include a second audio output module 152-2. The second audio output module 152-2 can cooperate with the first audio output module 152-1 to provide stereo output. Also, the second audio output module 152-2 may be configured to operate as a speakerphone.

A broadcast signal receiving antenna 111-1 may be disposed at one side of the second rear case 100B-2, in addition to an antenna for communications. The antenna 111-1 can be configured to retract into the second body 100B-2.

One portion of a slide module 100C which allows the first body 100A to be slidably coupled to the second body 100B may be disposed at the first rear case 100A-2 of the first body 100A. The other portion of the slide module 100C may be disposed at the second front case 100B-1 of the second body 100B, such that it may not be exposed to the exterior as illustrated in FIG. 3.

The second camera module 121-2 has been described as being located at the second body 100B. However, embodiments of the present invention may not be limited to the configuration.

For example, it is also possible that one or more of those components (e.g., 111-1, 121-2 to 121-3, 152-2), which have been described to be implemented on the second rear case 100B-2, such as the second camera module 121-2, can be implemented on the first body 100A, particularly, on the first rear case 100A-2. In this configuration, the component(s) disposed on the first rear case 100A-2 can be protected by the second body 100B in a closed position of the mobile terminal 100. In addition, without the second camera module 121-2, the first camera module 121-1 can be implemented to be rotatable so as to rotate up to a direction which the second camera module 121-2 faces.

Referring back to FIG. 1 and FIG. 2, the user input unit 130 generates key input data to be input by a user in order to control the operation of the mobile terminal 100, and generates key input data for setting and moving contents. The user input unit 130 may be implemented as a key pad dome switch, a touch pad, a jog wheel, or a jog switch. When the touch pad has a reciprocal layered structure with the display module 151, the user input unit 130 is implemented as a touch screen.

The output unit 150 may include the display module 151, the audio output module 152, and the alarm 153. The display module 151 displays information processed by the mobile terminal 100.

For example, when the mobile terminal is in a call mode, the display module 151 displays a UI or a GUI relating to a call. The display module 151 also displays various types of contents for multi-selection on a touch screen, such as SMS and music information in list form.

The memory 160 may store a program to be processed and controlled by the controller 180, and may temporarily store input/output data (e.g., messages, stationary images, moving images). The memory 160 may include at least one type of storage medium such as a flash memory, a hard disk, a multimedia micro card, a card memory (e.g., SD or XD memory), RAM, and ROM. The mobile terminal 100 may operate a web storage to perform a storage function by the memory 160 on the Internet.

The controller 180 controls the entire operation of the mobile terminal 100. For instance, the controller 180 performs controls and processes such as a voice call, a data communication, and a video call. Besides the general operation control, the controller 180 controls operations relating to multi-selection and/or deletion.

For example, when a content list is dragged to a first region from a predetermined region, a first function is executed. The first function is a multi-selection function. However, when the content list is dragged to a second region through the first region, a second function is executed. The second function is a function to delete the corresponding content list. Specifically, the controller displays and executes different functions according to a distance that a content list is dragged.

A method for executing a multi-function of a mobile terminal by dragging a content list according to an exemplary embodiment of the present invention will be explained in more detail with reference to the attached drawings.

Figure 4:
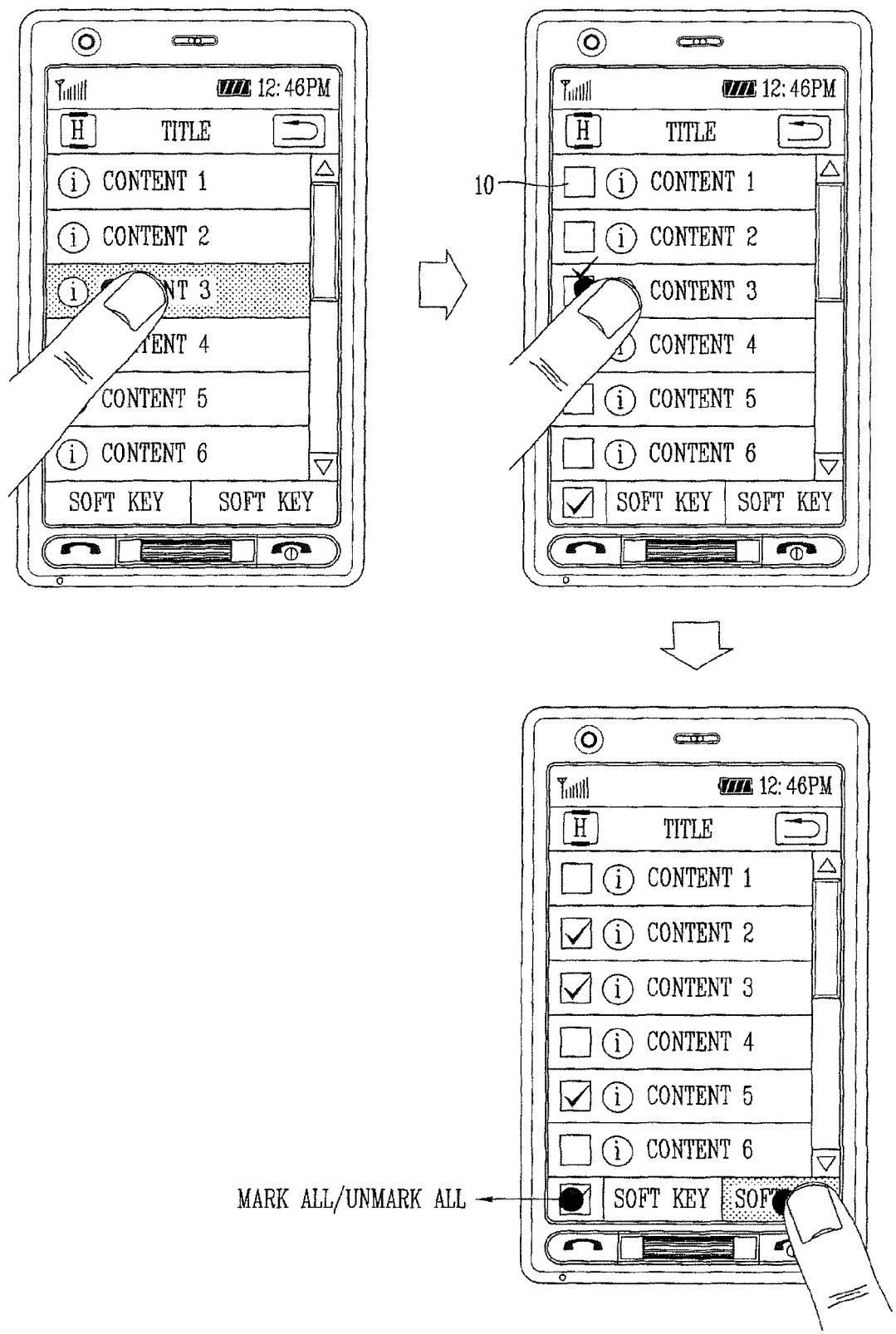
FIG. 4 is a view showing a method for executing a multi-function in a mobile terminal according to an exemplary embodiment of the present invention.

FIG. 4 is a view showing a method for executing a multi-function in a mobile terminal according to an exemplary embodiment of the present invention. In a mobile terminal having a touch function, a first function is set at a predetermined region, and a content list screen that covers the first function is moved in a drag manner to expose the first function such that the first function is executed as a user drags a content list to a first region.

Referring to FIG. 4, when a content list is dragged to the first region from the left to the right on the content list screen, the first function, such as selection windows 10 for content lists for multi-selection, is displayed. The content list may include an SMS or a music file.

A user selects a desired content list from a plurality of content lists by touching each selection window 10. The selected content list may then be integrally deleted, transferred, and reproduced for music by a soft key.

In an exemplary embodiment, when one content list is dragged to the first region, other content lists are simultaneously moved. However, when one content list is further moved through the first region, only a corresponding content list is moved. When the specific content list is moved through the first region, other content lists may be restored to the original positions.

Figure 5:
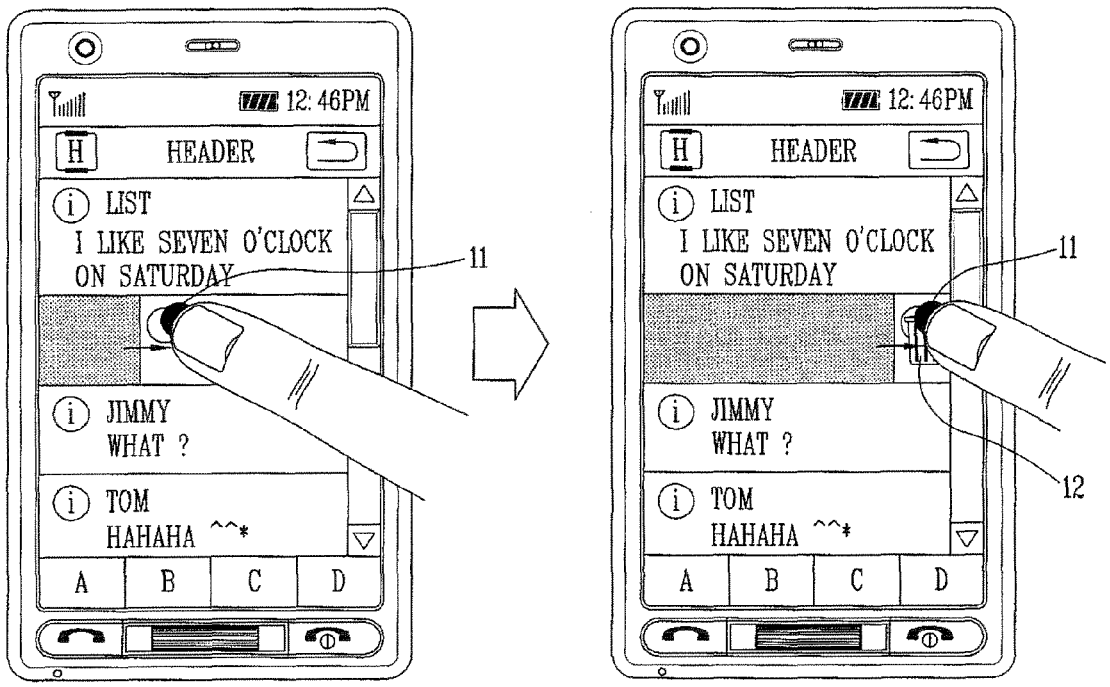
FIG. 5 and FIG. 6 are views showing a method for executing a multi-function in a mobile terminal according to another exemplary embodiment of the present invention.

FIG. 5 is a view showing a method for executing a multi-function in a mobile terminal according to an exemplary embodiment of the present invention. The method of FIG. 5 is the same as the method of FIG. 4 in that each list is considered as a block and each list is moved and deleted in a drag manner. The method of FIG. 5 is different from the method of FIG. 4 in that when a user drags a content list to a second region, a second function is executed.

Referring to FIG. 5, when a specific content list is touched (press & hold) on a content list screen, an edge 11 is displayed at the touched point. The edge 11 may have variable shapes and may be implemented in various forms. Specifically, any shapes or colors may be implemented as long as a selection for a corresponding content list in a touch manner can be indicated.

In an exemplary embodiment, when a content list is dragged, the content list is moved in the right or left direction. Specifically, the content list may be movable from the right to the left, or from the left to the right.

In an exemplary embodiment, when the content list is moved to a second region, a second function, such as a trash box icon 12 is displayed (slide-out). The trash box icon 12 may have any shape or color as long as it can be recognized by a user.

Figure 6:
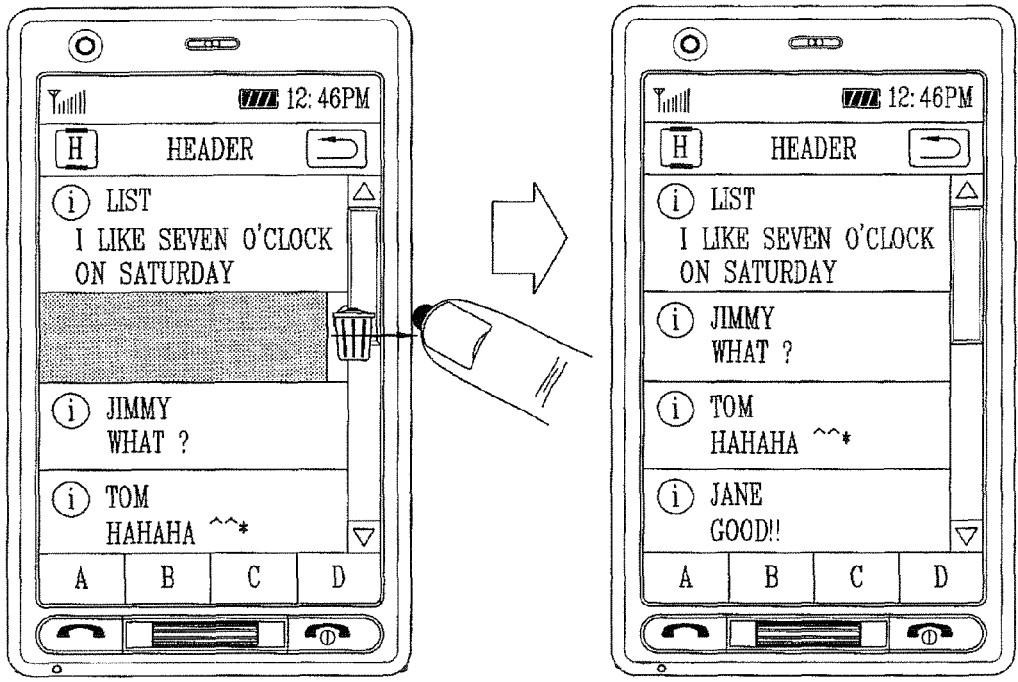

As shown in FIG. 6, when the moved content list is dragged out of the trash box icon 12, the corresponding content list is deleted. By repeatedly performing this operation, unnecessary content lists may be deleted without searching for additional menus. Content lists not discarded through the trash box icon are restored to the original position.

The method of FIG. 5 may be used together with the method of FIG. 4. In the mobile terminal having a touch function, a predetermined region is divided into a first region and a second region. Once a content list is dragged to a first region, a first function is executed, and when the content list is dragged to a second region through the first region, a second function is executed.

Once one content list is dragged to the first region, a plurality of content lists are displayed to allow a user to select a desired content list. In addition, once a corresponding content list is dragged to the second region through the first region, the trash box icon 12 is displayed to allow the corresponding content list to be deleted.

This is different from FIG. 4, where the corresponding content list is selected from the selection window 10 and is deleted by using a soft key, since the corresponding content list is deleted by using the trash box icon 12. Accordingly, when the two methods are executed, a multi-selection and a specific selection for desired content lists may be simultaneously performed on a touch screen without using an additional soft key.

Figure 7:
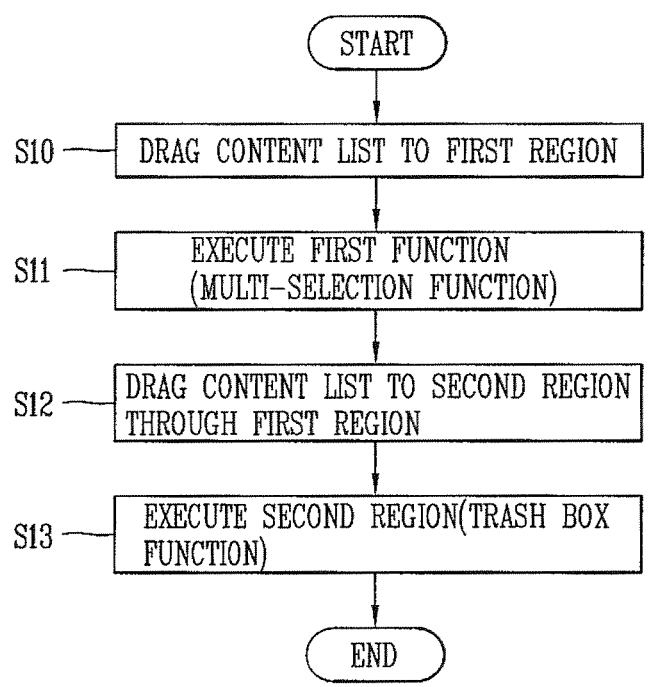
FIG. 7 is a flowchart showing a method for executing a multi-function of a mobile terminal according to an exemplary embodiment of the present invention.

FIG. 7 is a flowchart showing a method for executing a multi-function of a mobile terminal according to an exemplary embodiment of the present invention, which shows that the two methods of FIG. 4 and FIG. 5 are simultaneously executed. As shown in FIG. 7, once a user drags a content list to the first region from the left side to the right side on a content list screen (S10), the controller 180 displays the selection window 10 for each content list for multi-selection. Specifically, the controller 180 displays the first function on a predetermined region on the content list screen by controlling the display module 151 (S11).

In an exemplary embodiment, the selection window 10 is positioned at an area where the content list is moved. Accordingly, a user can select a desired content list by touching the selection window 10 for each content list.

When the user moves the corresponding content list to the second region through the first region (S12), the controller 180 detects approach of the content list, and displays a second function. For the second function, the controller 180 slides-out the trash box icon 12 at a right side of the content list screen in line with the dragged content list and slides the trash box icon 12 in a direction that the content list is dragged (S13). Accordingly, the user drags the content list out of the trash box icon 12, thereby deleting the content list from the content list screen.

In an exemplary embodiment, once the content list is dragged out of the trash box icon 12, the content list is deleted. In another exemplary embodiment, the content list is deleted only after the content list is dragged out of the trash box icon 12 and the user depresses the touch pad. Content lists not deleted after passing through the trash box icon are restored to their original positions after a predetermined time period lapses. Thus, in this embodiment, if a user drags a content list out of the trash box icon 12 and continues to touch the keypad longer than the predetermined time period, the dragged content list is restored to its original position.

Various embodiments described herein may be implemented in a computer-readable medium. The computer-readable medium may use software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For a software implementation, procedures and functions may be implemented together with separate software modules each of which performs at least one of the functions and operations. The software codes can be implemented with a software application written in any suitable programming language. Also, the software codes may be stored in the memory 160 and executed by the controller 180.

The foregoing embodiments and advantages are merely exemplary and are not to be construed as limiting the present invention. The present teachings can be readily applied to other types of apparatuses. This description is intended to be illustrative, and not to limit the scope of the claims.

Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

What is claimed is:

1. A mobile terminal comprising:
a display module configured to display a list of at least one content item on a content list screen comprising a first region and a second region that is aligned with the first region; and
a controller configured to:
select a content item in the displayed list when the content item is touched and retain selection of the content item while the content item is dragged to the first region; and
delete the selected content item when the selected content item is linearly dragged to the second region through the first region in response to a single touch-and-drag input,
wherein a portion of the dragged content item disappears from the content list screen when the portion of the dragged content item passes a side edge of the content list screen, and
wherein the dragged content item returns to an original position on the content list screen when the dragged content item is released prior to being dragged past the first region toward the second region such that the disappeared portion of the dragged content item reappears on the content list screen when the dragged content item returns to the original position.

2. The mobile terminal of claim 1, wherein the controller is further configured to control the display module to display an icon that indicates the deletion of the selected content item when the dragged content item reaches the second region, wherein the icon comprises a trash box icon.

3. The mobile terminal of claim 1, wherein the controller is further configured to control the display module to simultaneously move other content items in the displayed list of the at least one content item when the touch-and-drag input is applied to the selected content item.

4. The mobile terminal of claim 1, wherein the single touch-and-drag input applied to the content item is directed in a right direction or a left direction.

5. The mobile terminal of claim 1, wherein the controller is further configured to control the display module to highlight the content item upon the selection of the content item in the displayed list of the at least one content item.

6. The mobile terminal of claim 1, wherein the content item on the content list screen further comprises an edge at an end of the first region and a beginning of the second region.

7. The mobile terminal of claim 1, wherein the display module is further configured to display an indication in view of impending deletion of the content item when the dragged content item reaches the second region.

8. The mobile terminal of claim 7, wherein displaying the indication comprises displaying an icon to indicate the impending deletion of the content item when the content item is dragged over the edge.

9. The mobile terminal of claim 1, wherein the controller is further configured to perform different functions based on a distance of the dragging such that a first function is performed when the content item is dragged to the first region only and a second function is performed when the content item is dragged to the second region through the first region.

10. The mobile terminal of claim 9, wherein the first function is a multi-selection function for allowing selection of multiple content items from the list and the second function is the deletion of the dragged content item.

11. A method for executing multiple functions in a mobile terminal, the method comprising:
    displaying a list of at least one content item on a content list screen comprising a first region and a second region that is aligned with the first region;
    selecting a content item in the displayed list when the content item is touched and retaining selection of the content item while the content item is dragged to the first region; and
    deleting the selected content item when the selected content item is linearly dragged to the second region through the first region in response to a single touch-and-drag input,
    wherein a portion of the dragged content item disappears from the content list screen when the portion of the dragged content item passes a side edge of the content list screen, and
    wherein the dragged content item returns to an original position on the content list screen when the dragged content item is released prior to being dragged past the first region toward the second region such that the disappeared portion of the dragged content item reappears on the content list screen when the dragged content item returns to the original position.

12. The method of claim 11, further comprising simultaneously moving other content items in the displayed list of the at least one content item when the touched-and-drag input is applied to the selected content item.

13. The method of claim 11, further comprising displaying an icon that indicates the deletion of the selected content item when the dragged content item reaches the second region, wherein the icon comprises a trash box icon.

14. The method of claim 11, wherein the single touch-and-drag input applied to the content item is directed in a right direction or a left direction.

15. The method of claim 11, further comprising highlighting the content item upon the selection of the content item in the displayed list of the at least one content item.

16. The method of claim 11, wherein the content item on the content list screen further comprises an edge at an end of the first region and a beginning of the second region.

17. The method of claim 11, further comprising displaying an indication in view of impending deletion of the content item when the dragged content item reaches the second region.

18. The method of claim 17, wherein displaying the indication comprises displaying an icon to indicate the impending deletion of the content item when the content item is dragged over the edge.

19. The method of claim 11, wherein different functions are performed based on a distance of the dragging such that a first function is performed when the content item is dragged to the first region only and a second function is performed when the content item is dragged to the second region through the first region.

20. The method of claim 19, wherein the first function is a multi-selection function for allowing selection of multiple content items from the list and the second function is the deletion of the dragged content item.

* * * * *